(No Model.)
R. W. McGOVERN.
CABLE GRIP.
No. 300,492. Patented June 17, 1884.
2 Sheets—Sheet 1.
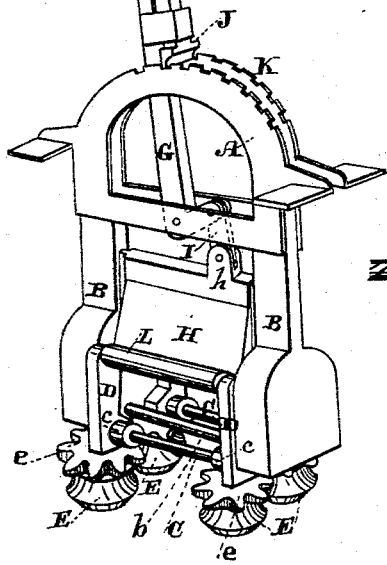
FIG. 1.
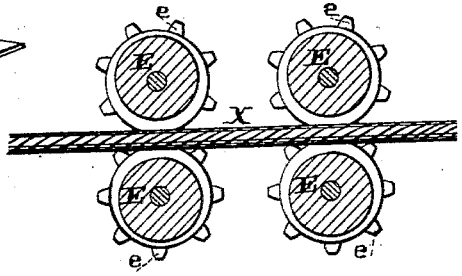
FIG. 2.
FIG. 3.
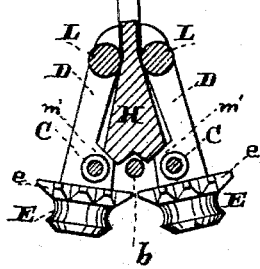
FIG. 4.
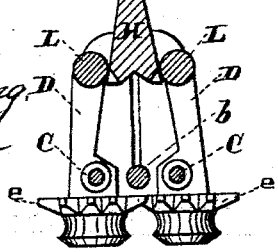
FIG. 5.
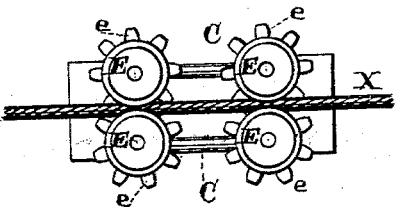
FIG. 6.
Witnesses,
Geo. H. Strong
Inventor,
R. W. McGovern
By
Dewey & Co.
Attorneys (No Model.) R. W. McGOVERN. 2 Sheets—Sheet 2.
CABLE GRIP.
No. 300,492. Patented June 17, 1884.
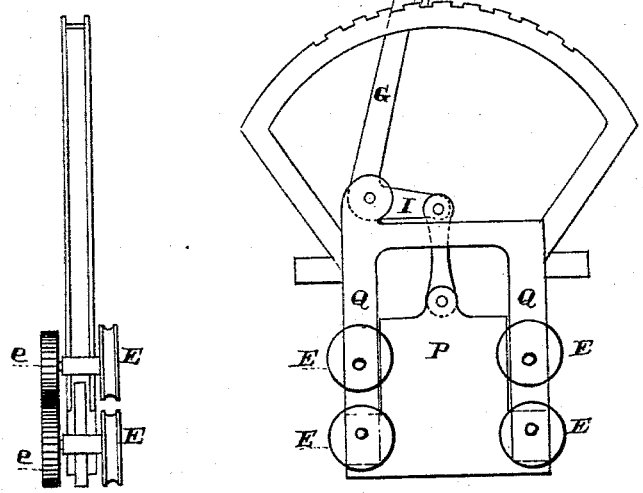

United States Patent Office.

RALPH W. McGOVERN, OF SAN FRANCISCO, CALIFORNIA.

CABLE-GRIP.

SPECIFICATION forming part of Letters Patent No. 300,492, dated June 17, 1884.

Application filed December 14, 1883. (No model.)

*To all whom it may concern:*

Be it known that I, RALPH W. MCGOVERN, of the city and county of San Francisco, and State of California, have invented an Improvement in Cable-Grips; and I hereby declare the following to be a full, clear, and exact description thereof.

My invention relates to a new and useful grip for coupling cars to the traveling cable from which the cars derive their motion.

In the present system of cable roads an endless cable travels in an underground tube or tunnel, and connection is made with it by what is known as a "grip," which is mounted on the car, and extends down by means of a narrow or thin shank through a slot in the road-bed, and operates to clamp the cable or release it when desired. These grips usually consist of two compressing-jaws, between which the cable is clamped; but it is obvious that the clamp cannot be put on with full force instantaneously, as that would give the car a jerk in starting, and consequently the grip is only partially forced to clamp the cable, which is allowed to slip through until the car has started, when the grip is tightened; but this necessary slipping of the cable wears it, and as it is very expensive and has frequently to be repaired or replaced, it becomes of great importance to prevent the necessity of this slipping, and so save the cable. A grip has also been invented in which rollers or pulleys clamp the cable; but the difficulty in this has been to prevent the rollers from turning continually, and to make them clamp the cable at all, for unless they are prevented from turning they will not hold the cable, but will revolve as does an ordinary pulley, no matter how tight its belt may be.

The object of my invention is to save the friction on the cable by obviating the necessity of slipping.

It consists in suitably mounted and operated rollers or pulleys, between which the cable is gripped, said rollers being either eccentrically mounted or provided with eccentric or cam faces, and geared together in pairs, whereby their eccentricity is made to correspond, to bind the cable and supplement the clamping pressure by which they first take hold of the cable.

It further consists in novel mechanism for operating the gripping-rollers, and in various details of construction, all of which I shall hereinafter fully explain by reference to the accompanying drawings, in which—

Figure 1 is a perspective view of my grip. Fig. 2 is a horizontal section through the gripping-pulleys, showing their cam or eccentric faces. Fig. 3 is a bottom view of said pulleys. Fig. 4 is a vertical section through the wedge H, showing it down to its limit, to force the pulleys apart. Fig. 5 is a similar section of same, showing wedge H raised to force the pulleys together. Fig. 6 is a side elevation of wedge and arms B. Fig. 7 is a front elevation of my grip, showing pulleys differently arranged. Fig. 8 is a vertical section of same.

A is the body of the grip, adapted to be secured to the car in suitable manner. This body is here shown as consisting of spaced plates, between which are bolted downwardly-extending arms B, having thin shanks to permit their entrance through the cable-slot, and enlarged ends, between which is a bar, *b*. Between the ends on each side of bar *b* are transverse shafts C, upon which, near each end, are loosely mounted arms D, which are held in place by collars *c*. On the lower ends of these arms are journaled grooved-face rollers or pulleys E, between which the cable X is gripped, Figs. 2, 3. Now, it is obvious that unless some means were used to prevent the rollers from turning they would not grip the traveling cable, no matter what pressure was brought to bear; but to accomplish this I turn or cut the groove face of each roller eccentrically or in a cam shape, so that the space between them may be increased or diminished, according to the eccentricity of the grooves—that is to say, they have a fast and a loose portion, Fig. 2. In order to make these correspond in each roller or pulley, I provide each with a cogged flange, *e*, and cause them to engage or mesh in pairs, so that in turning the fast portions in each will be always opposite each other, and the loose portions also. The effect of this is, that when the rollers are brought together to clamp the cable in the manner I shall presently describe they do not and cannot clamp it so tightly but that they will turn until the fast portion of their eccentric faces comes around and binds on the cable, when the grip is complete. This turning of the rollers prevents wear by the slipping of the cable, and yet gives the car time to get under headway by a partial grip before the cable is firmly clamped. By the time the fast portion takes full hold the car is started and there is little or no jar. The effect of the pulleys is the same whether they grip first on the fast or loose portion, for in the former case they will of course turn to the loose portion, in which, by the continued pressure on the lever above, the cable is clamped as well as possible, and the pulleys continue to turn until the fast portion binds on the cable. The gears cause the pulleys to act in unison. Now, it is plain that instead of making the faces of the pulleys eccentric, the pulleys themselves could be mounted eccentrically with a like effect as far as the gripping of the cable is concerned; but in that case their flanges or edges would not travel together as perfectly to inclose the cable, and it would be somewhat difficult to keep the gears in engagement. Therefore I consider that the eccentric or cam face for the pulley is a better construction than mounting the pulley itself eccentrically.

The means I use for forcing the pulleys together or apart are as follows: Between the arms B, and guided by a suitable tenon and groove, is a sliding inverted wedge, H, its apex being upward. This is raised and lowered by an elbow-lever, G, pivoted in the body-plate by its angle. Its lower arm is short, and is connected with a lug, $h$, on the top of wedge H by a pivoted bar or link, I. The upper arm of the lever is a long one, and is provided with a spring-pawl, J, which is adapted to engage with a rack, K, in usual manner.

Journaled between the tops of the arms D, which carry the gripping pulleys or rollers, are friction-rolls L, one lying on each side of the wedge. It will be observed that the arms D and their cross-rolls L above form frames, which are pivoted in the main arms B by the shafts C, heretofore mentioned, and these frames are adapted to swing on their pivot-shafts, to carry their gripping-pulleys together or apart. The upward movement of the wedge against the friction-rolls forces the upper ends of the frames apart, and thus forces their lower ends together to cause the pulleys to bear on the cable. The downward movement relieves them, so that the cable may pass freely through; but when it is desired to release the cable fully and let it drop down, the wedge H is forced farther down until its lower edge, the corners of which are rounded out at $m$ for the purpose, bears upon an inwardly-projecting foot portion, $m'$, made in the lower ends of arms D, Figs. 6 and 4. This bearing on the arms positively forces their lower ends outward to carry the gripping-pulleys apart sufficiently to let the cable drop. The lower or under side of the wedge H is grooved to allow it to fit down upon and find support on the cross-bar $b$.

As far as the essential feature of my invention—namely, the eccentric or cam faced pulleys geared together as shown—is concerned, I do not confine myself to the particular arrangement I have so far described. Instead of mounting them in a horizontal plane on vertical journals, I may mount them in a vertical plane on horizontal shafts. This I illustrate in Figs. 7, 8, the changes herein in other parts being such as are necessary to operating the eccentric gripping-pulleys.

A sliding block, P, operated by lever G and connecting-link I, carries the lower gripping-pulleys, while the upper ones are mounted on the stationary arms Q, corresponding to arms B. The shafts of these pulleys extend through the frame and carry the gears $e$ on the other side. The operation of this arrangement is similar to that which I have described.

Having thus described my invention, what I claim as new, and desire to secure by Letters Patent, is—

1. In a cable-grip, oppositely-placed eccentric rollers or pulleys, between which the moving cable passes, in combination with suitable mechanism for forcing said eccentric pulleys or rollers against the cable, substantially as herein described.

2. In a cable-grip, oppositely-placed eccentric rollers or pulleys, between which the moving cable passes, said rollers or pulleys being geared together to cause their eccentricities to correspond in their revolution, in combination with suitable mechanism for forcing them against the cable, substantially as and for the purpose herein described.

3. In a cable-grip, the oppositely-located rollers or pulleys E, between which the moving cable passes, said rollers or pulleys having grooved cam-faces—that is to say, formed eccentrically with relation to the axis of revolution of said rollers or pulleys—in combination with mechanism for forcing the faces of said rollers or pulleys against the moving cable, substantially as herein described.

4. In a cable-grip, the oppositely-located rollers or pulleys E, between which the moving cable passes, said rollers or pulleys having grooved cam-faces, as described, and the cogged flanges $e$ on said pulleys, whereby they engage in pairs to cause their timely revolution to make their cam-faces correspond, in combination with mechanism for forcing the faces of said rollers or pulleys against the moving cable, substantially as herein described.

5. In a cable-grip, a suitable frame and swinging arms or frames pivoted thereto on each side, said arms or frames carrying the eccentric or cam rollers or pulleys E, oppositely located, and between the faces of which the moving cable passes, in combination with the wedge-block H, guided in the main frame, and lying between the swinging arms or frames and impinging thereon, and a means for reciprocating said wedge to force together or apart said arms or frames, to cause their rollers or pulleys to bear against or relieve the moving cable, substantially as herein described.

6. In a cable-grip, the main body-plate A and the downwardly-extending arms B, the side arms, D, pivoted to arms B by shafts C, and having the friction-rolls L in their tops, and the oppositely-located eccentric or cam rollers or pulleys E, geared together and mounted on said arms D, in combination with the inverted wedge-block H, guided between arms B, and having its sides impinging against the friction-rolls L, the pivoted elbow-lever G, and the pivoted bar or link I, connecting said lever with the wedge H, substantially as and for the purpose herein described.

7. In a cable-grip, the main plate A, arms B, shafts C, set between said arms, the arms D, pivoted on said shafts and having the inwardly-projecting foot portion $m'$, and the friction-rolls L, and the eccentric or cam rollers or pulleys E, geared together and arranged as shown, in combination with the inverted wedge H, having the rounded corners $m$, adapted to impinge on the foot portion $m'$, and means for reciprocating said wedge, substantially as herein described.

8. In a cable-grip, the plate A, arms B, having cross-bar $b$, shaft C, arms D, having inwardly-projecting portion $m'$, and friction-rolls L, and the eccentric or cam rollers or pulleys E, geared together and arranged as shown, in combination with the inverted wedge H, having rounded corners $m$, and means for reciprocating said wedge, all arranged and operating substantially as and for the purpose herein described.

In witness whereof I have hereunto set my hand.

RALPH W. McGOVERN.

Witnesses:
C. D. COLE,
J. H. BLOOD.